Nov. 5, 1963 M. SOGHOIAN 3,109,885

COLOR TELEVISION RECEIVER

Filed April 18, 1958 3 Sheets-Sheet 1

INVENTOR

Marshall Soghoian

BY Shoemaker & Mattare

ATTORNEYS

Nov. 5, 1963 M. SOGHOIAN 3,109,885

COLOR TELEVISION RECEIVER

Filed April 18, 1958

3 Sheets-Sheet 2

INVENTOR

Marshall Soghoian

BY Shoemaker & Mattare

ATTORNEYS

Nov. 5, 1963 M. SOGHOIAN 3,109,885

COLOR TELEVISION RECEIVER

Filed April 18, 1958 3 Sheets-Sheet 3

INVENTOR

Marshall Soghoian

BY Shoemaker & Mattare

ATTORNEYS

United States Patent Office 3,109,885

Patented Nov. 5, 1963

3,109,885

COLOR TELEVISION RECEIVER

Marshall Soghoian, 6319 Kensington Ave., Richmond, Va.

Filed Apr. 18, 1958, Ser. No. 729,330
1 Claim. (Cl. 178—5.4)

This invention relates to a color television receiver and more particularly to a device which permits the reception of color television programs on a conventional black and white receiver with a minimum of modification.

The system of color television presently in use in the United States is the so-called NTSC system. In accordance with this system the scenes to be transmitted and reproduced in natural or full color are viewed or picked up by a camera having three camera tubes upon which images in the primary or elemental colors, red, green, and blue are projected by an optical system which divides out the elemental color images from the full color scene. When the color information from the respective cameras has been processed electronically, it is transmitted to the receivers at which the full color scenes are to be reproduced. The system presently in use is a so-called simultaneous system, wherein information as to the three primary colors is transmitted simultaneously, and is also a compatible system, whereby television receivers which are not equipped to reproduce full color images are able to receive the transmitted color programs and to reproduce the same in black and white. While numerous types of color television receivers have been developed, the type most commonly in present use employs the shadow mask tube having three electron guns. The beams from these guns are directed respectively at red, green, and blue phosphor dots on the screen of the cathode ray tube. In the field sequential system utilized prior to the NTSC system, the color information is segregated into elemental color fields and the scenes are reproduced at the receiver through the use of a rotating color wheel having elemental color segments which pass before the screen of a conventional black and white cathode ray tube in synchronism with the production of the elemental field images on the screen of the tube.

The device of the present invention may be utilized to produce full color images from signals which are transmitted in accordance with the NTSC or the field sequential methods, for example. In utilizing the device of the invention nothing is changed with respect to the transmission of the television signals. Moreover, the present invention is essentially an adjunct to a conventional black and white television receiver and is readily adaptable to produce full color images in conjunction with the television receivers presently employed.

Accordingly, it is a principal object of the invention to provide a unique and improved color television receiver.

A further object of the invention is to provide a device which permits the reproduction on present black and white television receiving sets of full color images.

Another object of the invention is to provide a unique electro-optical device which may be incorporated in or added to the cathode ray tubes of the type presently employed in black and white television receivers.

An additional object of the invention is to provide a device of the foregoing type which will not interfere with the reproduction of television programs in black and white by the receiver sets in which it is incorporated.

Yet another object of the invention is to provide a device of the foregoing type which is entirely electronic and which obviates the disadvantages of comparable devices utilizing moving mechanical parts.

The foregoing and other objects of the invention and the manner in which such objects are accomplished will become more readily apparent upon consideration of the following detailed description of the invention taken in conjunction with the accompanying drawings, which illustrate exemplary embodiments of the invention and wherein.

Briefly stated, the present invention utilizes a device, which for convenience is termed a "color window," that produces images in full color from black and white images formed on the screen of a conventional or basically conventional black and white picture tube. The color window in its preferred form comprises three color cells which are energized sequentially in synchronism with the production of black and white images on the screen of the picture tube, the latter images corresponding to the elemental color fields. In one form of the invention, the color window is placed in front of the screen of a conventional black and white picture tube, while in another form it is incorporated in the tube. The color cells are activated by the white light from the screen of the picture tube and produce superposed elemental color images which are seen by the viewer as a full color picture. When the invention is used to reproduce signals transmitted in accordance with the NTSC system, a color converter is employed to produce the desired black and white images on the picture tube.

Figure 1:
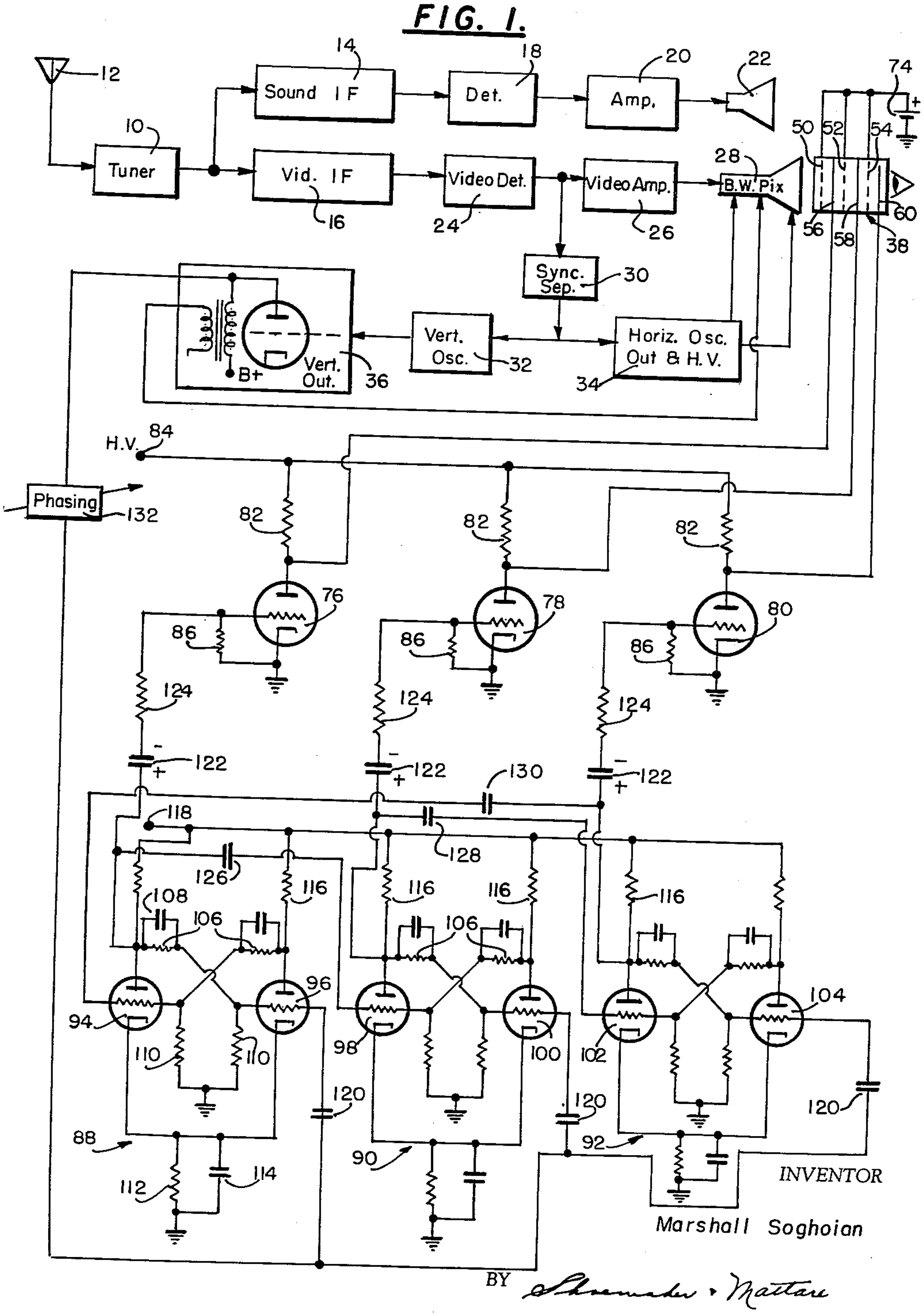
FIGURE 1 is a schematic, partially block diagram of a preferred circuit employed in accordance with the teachings of the invention, the electro-optical elements of the invention being illustrated somewhat diagrammatically.

Referirng now to the drawings, in FIGURE 1 is illustrated a conventional black and white television receiver, which, as is well known, has a tuner 10 receiving signals from an antenna 12. The receiver illustrated is of the split sound and picture type, although an intercarrier set could be employed equally well, and the output of the tuner 10 is applied to separate sound IF and video IF stages 14, 16, respectively. In the usual manner, the sound signals are detected in a sound detector 18, are then amplified in an amplifier 20, and finally are applied to a loudspeaker 22. The video signals are detected in a video detector 24, and the signals are then separated into picture producing information, which is passed through a video amplifier 26 to a conventional black and white picture tube 28, and synchronizing information, which is passed from a sync separator 30 to vertical and horizontal sweep stages 32, 34, respectively. For clarity, the vertical output stage 36 is shown separately from the vertical oscillator 32, while the horizontal output stage as well as the high voltage circuitry has been included within the block 34. The outputs of the horizontal and vertical deflection stages are applied to the appropriate deflection means of the cathode ray tube, while the output of the high voltage stage is applied to the second anode of the picture tube, in the well known manner.

Figure 2:
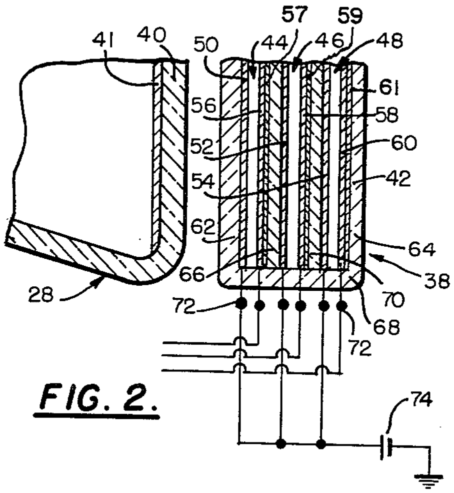
FIGURE 2 is a partial longitudinal sectional view of a first form of the electro-optical device of the invention, illustrating the electrical connections to the device.

Placed in front of the screen of the picture tube 28 is the color window 38 of the invention. The window is illustrated in greater detail in FIGURE 2, wherein the thickness of the window has been exaggerated for clarity of the explanation. The color window is of a shape and size to conform to the configuration of the screen 40 of the cathode ray tube 28. It comprises an outer envelope 42 of glass or similar transparent material. The envelope may be placed against or spaced slightly from the screen 40 of the cathode ray tube (which supports a white light emitting phosphor layer 41), and in some instances it may be desirable to insert an optical system of lenses between the screen and the envelope, thereby to use more efficiently the light emitted from the screen.

In the form shown, the color window comprises three color cells, a red cell 44, a green cell 46, and a blue cell 48. These cells are in superposed relationship before the screen of the cathode ray tube. Each cell has a photocathode or layer of photoemissive material, respectively 50, 52, 54, and a target or screen, respectively 56, 58, and 60. Photocathode 50 may be supported on the rear wall 62 of the housing, while target 60 may be supported on the front wall 64 of the housing. Target 56 and photocathode 52 are supported on opposite sides of a transparent plate or panel 66 of glass or other suitable material secured to the side walls 68 of the housing in any suitable manner; target 58 and photocathode 54 are secured to opposite sides of a plate 70 in a similar manner. The photocathode and target of each cell are spaced from each other slightly as shown, and the space within the cells and the housing as a whole is evacuated in a manner well known in the art.

In accordance with the teachings of the invention, both the photocathodes and the targets are transparent to visible light so that light may pass substantially unimpeded through the color window. The transparent photocathodes may be formed, for example, by depositing silver caesium on one surface of the supporting walls or panels. In an exemplary method of forming the photocathodes, a thin film of silver is first deposited on the supporting surface by the well known evaporation method. The surface is then heated to 350° to 400° C. to degas and oxidize the silver coating with a glow discharge in a hydrogen atmosphere. After evacuating the chamber containing the surface thus formed, caesium is then evaporated with an induction heater at a temperature of from 800° to 900° C. and is deposited in a thin film upon the silver coating, whereupon the layer thus formed is baked between 150° and 250° C. If a greater quantum yield, that is the photocurrent per watt of radiant energy, is desired, antimony may be used in place of the silver. The resultant photocathode is thus a thin transparent conductive film of photoemissive material supported on the transparent wall or plate of the color window.

The targets of the invention are transparent layers of phosphorescent material chosen to emit red, green, and blue light, respectively, when electrons impinge thereon. The transparent phosphors may be made, for example, in the manner set forth in the article by Ferd E. Williams entitled "Some New Aspects of Germanate and Fluoride Phosphors," published in the Journal of the Optical Society of America, volume 37, No. 4, April 1947. The transparent phosphors may be prepared by the formation of the phosphor on a heated surface by the chemical reaction of chemical compounds in appropriate vapors at relatively high temperature in the presence of hydrogen sulphide at from 1 to 5 mm. pressure. The surface of the glass, of course, must be chemically clean for best results. The three primary colors are obtained by vaporizing zinc chloride with zinc in the presence of hydrogen sulphide to produce a transparent blue emitting phosphor, by vaporizing manganese with zinc in the presence of hydrogen sulphide to produce a transparent red emitting phosphor, and by vaporizing copper with zinc in the presence of hydrogen sulphide to produce a transparent green emitting phosphor. A thin transparent conducting layer, such as thin layers of titanium dioxide ($TiO_2$) 57, 59, 61 is deposited on the supporting walls or panels 66, 70 and 64, respectively, of the color window prior to the application of the phosphor coatings. In the preferred form of the invention, the targets also constitute the anodes of the individual cells, and these anodes as well as the photocathodes are connected, by virtue of their conductive layers, to terminals 72 on the exterior of the housing 38, the terminals being connected in turn to suitable lead-in wires as shown.

Figure 3:
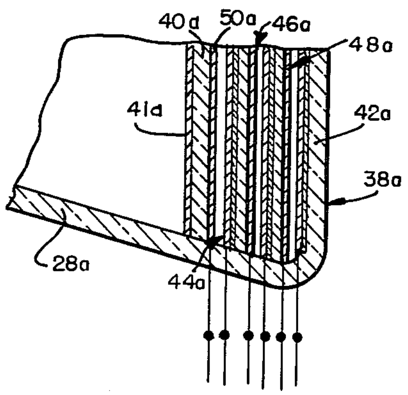
FIGURE 3 is a similar view of a second form of the device.

In the alternative form of the invention, as shown in FIG. 3, the color window 38*a* is incorporated in the envelope 28*a* of the picture tube. Panel 40*a* then becomes integral with the former rear wall of the color window and supports the white light emitting phosphor 41 as well as the photocathode 50*a* of the first color cell 44*a*. The front wall 42*a* of the color window then becomes the face of the picture tube, and the remaining color cells 46*a* and 48*a* are constructed in exactly the same manner as the embodiment previously described.

When the white light emitted by the phosphor layer 41 of the picture tube strikes any of the photocathodes, electrons are emitted at the point at which the light falls upon the photocathode. If, by the application of a suitable potential, the target or anode is made positive with respect to the photocathode, the electrons thus emitted with migrate to the target and upon impinging on the target will cause visible light to be emitted from the phosphor layer. The color of the light will depend upon the particular phosphor layer under consideration. Since the color window and its elements are transparent, the white light from the picture tube may pass through the color window and strike any and all of the photocathodes. However, if only certain cells are energized, as by the application thereto of the potential just described, those cells, and not the others, will produce visible images in the respective primary colors. It will thus be apparent that if black and white images are produced on the screen of the picture tube in sequence in a manner such that these images correspond to the fields of a field sequential color television system, and if the cells are energized in sequence, so that the red cell is energized when a red field is to be reproduced, the green cell when a green field is to be reproduced, and the blue cell when a blue field is to be reproduced, a full color picture may be produced by the superposition of the elemental color images, provided that the images are produced in fast enough sequence to afford persistence of vision. Accordingly, with a field sequential system of television, it is only necessary to ensure that the color cells are energized in the proper sequence and in synchronism with the production of the black and white images on the picture tube.

The photocathode surfaces 50, 52 and 54 are such that they are only effected by the radiations from the screen 41, thereby preventing the radiations from any of the previously energized phosphor surfaces, except the screen 41, from causing light emitted by that phosphor surface energizing the subsequent photocathode surfaces.

FIGURE 1 illustrates the manner in which this may be accomplished. The photocathodes 50, 52, and 54 are connected to the positive terminal of a battery 74, the negative terminal being grounded. The targets or anodes 56, 58 and 60 are connected respectively to the plates of gating or switching tubes 76, 78, and 80. These tubes are connected through plate load resistors 82 to a source of high voltage at terminal 84, as for example, about 6.5 kv. The cathodes of the gating tubes are grounded and are connected to the control grids through grid return resistors 86. The gating tubes are triggered by a ring type circuit comprising three flip-flop circuits 88, 90, and 92. Each flip-flop circuit may be of conventional form and comprises a pair of tubes 94 and 96, 98 and 100, or 102 and 104. The plates and control grids of the tubes of each flip-flop circuit are cross connected through resistors 106, which are shunted by condensers 108. The grids are connected to ground through resistors 110. The cathodes of the tubes are connected to ground through common cathode resistors 112 shunted by condensers 114. Plate load resistors 116 connect the tubes to a source of B plus, for example 220 volts at terminal 118. One tube of each flip-flop circuit, tubes 96, 100 and 104 in the drawing, has its grid connected through a coupling condenser 120 to the plate of the vertical output tube in block 36. The other tube of each pair has its plate connected through a coupling condenser 122 and resistor 124 to the grid of a corresponding gating tube 76, 78, or 80. Tube 94 of flip-flop 88 also has its plate connected through a coupling condenser 126 to the grid of tube 98 in flip-flop 90. Similarly the plate of tube 98 is connected through coupling condenser 128 to the grid of tube 102, and the plate of tube 102 is connected through coupling condenser 130 to the grid of tube 94.

Figure 4:
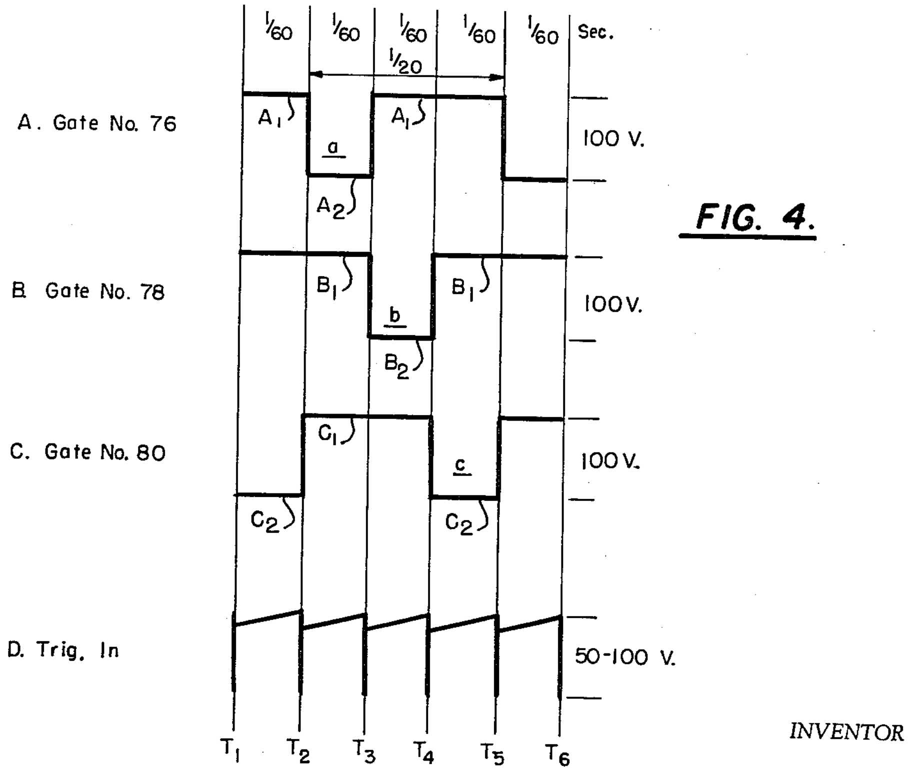
FIGURE 4 is a graphical diagram of certain wave forms illustrative of the operation of the invention.

The operation of the circuit of FIGURE 1 may be seen by referring to the graphical diagram of FIGURE 4, wherein curve A represents the grid potential of gating tube 76, curve B, the grid potential of gating tube 78, and curve C, the grid potential of tube 80. Curve D represents the triggering pulses applied to the flip-flop circuits from the vertical output tube. Since flip-flop circuits are bi-stable devices, one tube of each flip-flop circuit will conduct while the other is non-conducting, and vice versa. In the interval of time between $T_1$ and $T_2$ tube 94 is cut off, and tube 96 is conducting; hence the potential at the plate of tube 94 is relatively high, approximately the potential of the supply at terminal 118, and the potential applied to the grid of the gating tube 76 is also relatively high at level $A_1$ in curve A (coupling condenser 122 being substantially a short circuit at the switching frequencies involved in the operation of the invention). The same conditions are true with respect to flip-flop circuit 90, tube 98 being cut off and tube 100 being conducting. The potential at the grid of gating tube 78 is thus relatively high at level $B_1$ in curve B. The condition of flip-flop circuit 92 is reversed, however, tube 102 being conducting, and tube 104 cut off. The current passing through the plate load resistor 116 of tube 102 drops the voltage at the plate of the tube, and the voltage applied to the grid of gating tube 80 is accordingly relatively low at level $C_2$ in curve C. At time $T_2$ the triggering voltage applied from the vertical output tube through the coupling condensers 120 reaches a level sufficient to cause tube 104 to conduct (the triggering voltage having no effect on tubes 96 and 100 because these tubes are already conducting), and when tube 104 conducts, tube 102 is cut off, raising the potential at its plate, and raising the potential at the grid of gating tube 80 to the level $C_1$ in curve C. This rise of potential is applied through coupling condenser 130 to the grid of tube 94 and causes tube 94 to conduct, thereby cutting off tube 96. When tube 94 conducts, its plate potential drops, and the potential at the grid of tube 76 drops to the level $A_2$ as shown in curve A. The drop in potential at the plate of tube 94 is coupled to the grid of tube 98 through coupling condenser 126 but has no effect, since this tube is already cut off. Conditions remain thus in the interval of time $T_2$—$T_3$, and at time $T_3$ the next triggering pulse from the vertical output tube causes tube 96 to conduct, having no effect on tubes 100 and 104 which are already conductive. When tube 96 conducts, tube 94 is cut off, and its plate potential rises, causing the potential at the grid of gating tube 76 to rise again to the level $A_1$. The rise in potential at the plate of tube 94 is coupled through condenser 126 to the grid of tube 98, causing this tube to conduct and drop its plate potential, thereby dropping the potential at the grid of gating tube 78 to the level $B_2$. The drop in potential at the plate of tube 98 is coupled to the grid of tube 102 through condenser 128 but has no effect, because tube 102 is already cut off. The cycle of operation continues in the same manner as the successive triggering pulses are applied to the flip-flop tubes and results in the production of negative gating pulses *a*, *b*, and *c* in sequence, the process being continuous. These pulses when applied to the gating tubes 76, 78, and 80 cause the respective tubes to be cut off in sequence. When this happens, the plate potential of the tubes rises approximately to the level of the high voltage at terminal 84, and the potential at the anodes or targets of the color cells becomes highly positive accordingly. The application of these positive potentials to the respective anodes of the color cells in sequence allows each cell to produce its elemental color image in synchronism with the production of a corresponding black and white image on the screen of the cathode ray tube 28, these image fields being timed by the pulses which trigger the vertical oscillator. In order to ensure that initial triggering of the red cell will occur in synchronism with the production of the corresponding black and white image on the cathode ray tube (and hence that the green and blue cells will be triggered in phase with their black and white images) a phasing control 132 is shown in the conductor leading from the vertical output tube to the flip-flop circuits to allow such initial adjustment.

Battery 74 applies a quiescent positive bias to the photocathodes, which may be about 150 volts, so that in the "off" periods of the cells, any electrons which are emitted from the photocathodes will be repelled from their targets and will not produce a visible image.

The switching rate of the color cells of the invention is relatively low, 60 fields per second in the conventional system. The scanning program is as follows:

Field 1, odd red lines formed by cell 44.
Field 2, even green lines formed by cell 46.
Field 3, odd blue lines formed by cell 48.
Field 4, even red lines formed by cell 44.
Field 5, odd green lines formed by cell 46.
Field 6, even blue lines formed by cell 48.

This completes a single color frame, the fields being interlaced in the usual manner. With the assumed field frequency, the frame frequency is 10 color frames per second.

Typical tube types and component values for the circuit of FIGURE 1 are as follows:

*Tubes*

| Reference No. | Type |
|---|---|
| **76**, **78**, **80** | 2C53 |
| (**94** and **96**), (**98** and **100**), (**102** and **104**) | 12AU7 |

Meaning two tubes in one envelope.

*Resistors*

| Reference No.: | Value |
|---|---|
| **82** | 6.6M (16 watt). |
| **86** | 1M. |
| **106** | 470K. |
| **110** | 330K. |
| **112** | 22K. |
| **116** | 33K. |
| **124** | 100K. |

*Capacitors*

| Reference No.: | Value |
|---|---|
| **108** | 30 mmf. |
| **114** | .01 mfd. |
| **120** | 10 mmf. |
| **122** | 10 mfd. |
| **126**, **128**, **130** | 10 mmf. |

Since the color window and its components are transparent, the color window will not interfere with the production of black and white pictures by the television receiver during black and white transmission when the cells are "off." Such black and white images will simply pass through the color window and will be viewed as before. When black and white pictures are viewed, the color cell triggering circuits are deenergized, by opening an appropriately located switch, but the positive bias applied by battery 74 may be allowed to remain so as to prevent any extraneous color effects which might be caused by electrons emitted from the photocathodes.

The color window of the invention can also be utilized in conjunction with a cathode ray tube which has a screen that emits invisible radiation, such as infrared or ultraviolet, and the photocathodes may be designed so as to be particularly responsive to such invisible radiation. This will increase the intensity of the full color image by eliminating the white light emitted by the usual cathode ray tube screen, which light may have some tendency to wash out the color image. In order to receive black and white programs with such a receiver, the circuit is arranged so that all of the color cells are energized continuously during the reception of the black and white program, and the superposition of the primary colors will produce a black and white image. If desired, auxiliary bias controls may be employed to adjust the intensity of the primary colors to ensure a truly white image. Moreover, such intensity controls may be employed for color programming so that the various hues may be adjusted according to the taste of the viewer.

Figure 5:
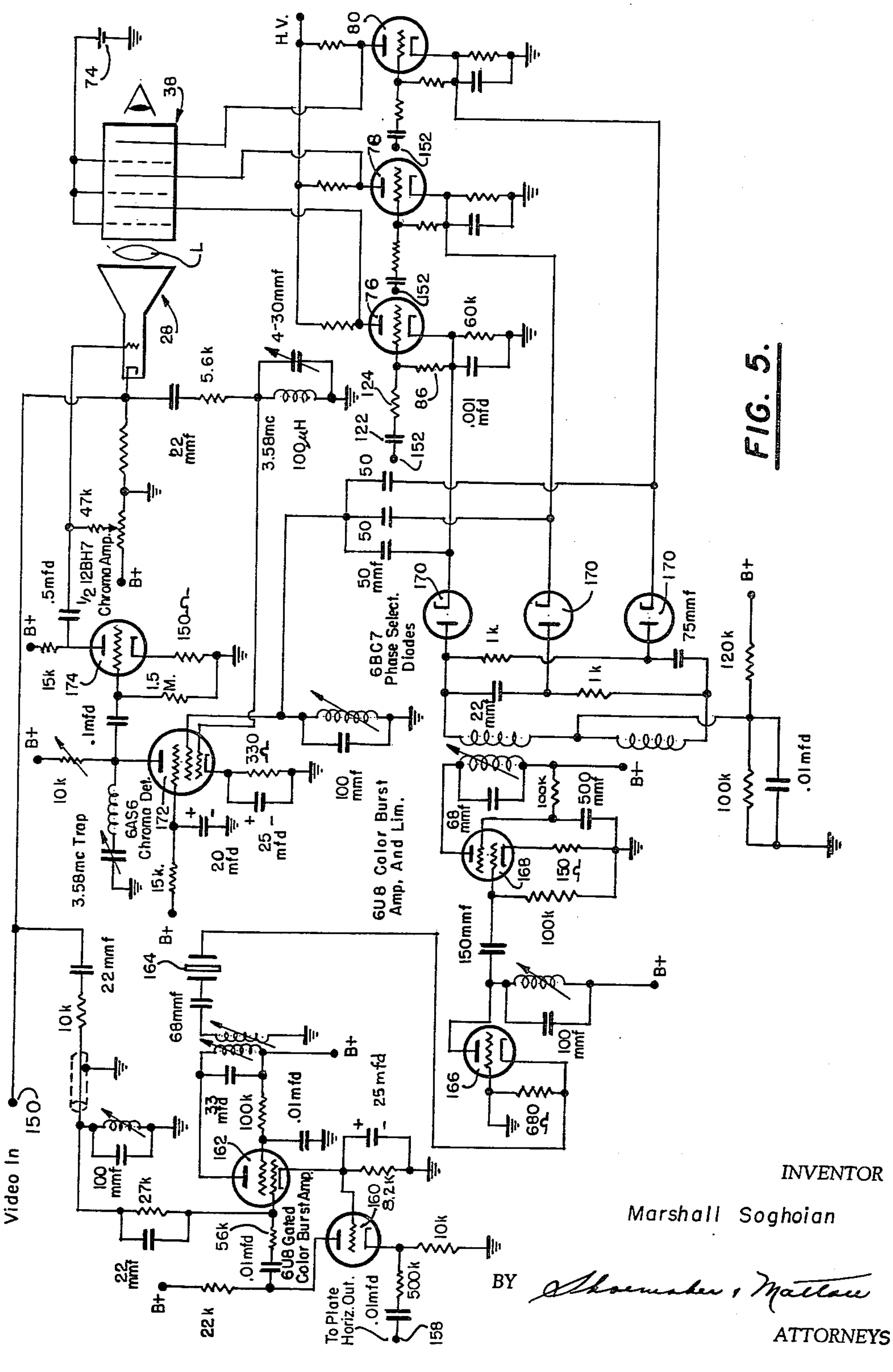
FIGURE 5 is a schematic diagram of a circuit which may be employed to permit the use of the invention in conjunction with the NTSC system of color television.

The foregoing description of the invention has been in connection with the well known field sequential system of color transmission and reception. By using a suitable converter, the invention may be employed to receive color programs transmitted in the NTSC system. With such a converter, the color cells are triggered in sequence, but the converter divides the incoming color intelligence so that only "red" information is applied to the black and white picture tube when the red cell is energized, "blue" information when the blue cell is energized, and "green" information when the green cell is energized. Since any suitable converter may be employed, the typical converter illustrated in FIGURE 5 will be described only briefly. The color window 38 is placed before the black and white picture tube 28 as before, and as described previously, an optical system of lenses L may be interposed. If desired, a similar optical system may be placed between the front of the color window and the viewer, and this may also be done in the previously described embodiment of the invention. The color window may also be incorporated in the cathode ray tube as described in conjunction with the embodiment of FIGURE 3. The video information may be applied to the cathode of the picture tube 28 from terminal 150 which is connected to the output of the conventional video amplifier. The gating signals are applied to the gate tubes 76, 78, and 80 from terminals 152 which are connected to the flip-flop circuits described in connection with the embodiment of FIGURE 1.

Terminal 158 connected to the plate of the horizontal output tube of the television receiver is connected to the input of a gated color burst amplifier comprising tubes 160 and 162 and the other components illustrated. The received color signal is segregated by the filter network connected to terminal 150 and is applied to the control grid of tube 162. The output of this amplifier is transformer coupled to a crystal filter 164 and then to the input of a color burst amplifier and limiter comprising tubes 166 and 168 and the other components illustrated. The output of the color burst amplifier and limiter is transformer coupled to a phase splitter network connected to phase selector diodes 170. The phase selector diodes are connected to the cathodes of the gating tubes 76, 78, and 80 and to the screen grid of a chroma detector tube 172 to the control grid of which the undetected color information is coupled by a filter network which segregates it from the composite video at terminal 150. The plate of the chroma detector is coupled to the grid of a chroma amplifier tube 174, the plate of which is coupled to the control grid of the cathode ray tube 28.

To describe the operation of the circuit briefly, the pulses applied to terminal 158 from the plate of the horizontal output tube gate the gated color burst amplifier so as to pass the 3.58 mc. color burst in the color signal filtered from the video information at terminal 150. The burst is applied to the crystal 164, which produces a prolonged 3.58 mc. wave that is amplified and limited by the color burst amplifier and limiter. This wave is split in phase and applied to the phase selector diodes, which produce phase displaced positive half-cycles of the 3.58 mc. wave to gate the gating tubes 76, 78 and 80. Tubes 76, 78, and 80 become coincidence tubes which trigger the respective color cells only upon the application to the tubes of simultaneous gating signals from the flip-flop circuits and the phase selector diodes. The outputs of the phase selector diodes are combined and applied to the chroma detector to detect the chrominance signal in the video information at terminal 150, and the detected signal is amplified by the chroma amplifier and is then applied to the control grid of the cathode ray tube 28, whereby it is superposed upon the luminance information applied to the cathode of the tube. A delay line may be used in the luminance signal path to ensure proper phasing with the chrominance signal. Since the phase selector diodes control both the gating of the color cells and the detection of the chrominance signal, only the color information corresponding to the particular color cell energized will be displayed. Typical types and values of the components employed in the circuit are as shown in the drawing.

A magnetic means can be placed in proximity to the color window to focus the electron beams so as to make a clearer and sharper picture.

The degree of transparency as referred to herein is of such order that the radiation from 41 can freely pass through and activate photocathode coatings 50, 52 and 54, and the electrons thus emitted by the photocathode coatings will activate and cause the targets 56, 58 and 60 to emit red, green and blue radiations, respectively, and such radiations to pass through the other parts of the color window and be viewed easily by the viewer.

This application is a continuation-in-part of my application Serial No. 410,320, filed February 15, 1954, now abandoned.

While preferred forms of the invention have been shown and described, it will be apparent to those skilled in the art that modifications can be made in these forms without departing from the principles and spirit of the invention, the scope of which is defined in the appended claim. Accordingly, the foregoing forms are to be considered exemplary, rather than restrictive, and those modifications which come within the meaning and range of equivalency of the claim are included therein.

I claim as my invention:

For use in a television receiver of the type having a picture tube with a screen on which sequential black and white images are produced corresponding to the elemental color fields of scenes to be reproduced in full color, a device for producing images of said scenes in full color from such black and white images comprising a plurality of color cells arranged in superposed relationship in an evacuated envelope, said envelope positioned in front of said screen, each of said cells including a substantially full transparent photocathode for emitting electrons in response to light impinging thereon from said black and white image, a target for said electrons having a substantially fully transparent layer of phosphorescent material which emits light in an elemental color of said full color images in response to impingement of said electrons thereon, a substantially fully transparent conducting layer disposed on said target on the side opposite said photocathode, and a transparent panel for supporting said cells in said envelope, a first source of potential connected to said targets of said cells whereby said targets may be energized in sequence and in synchronism with the production of said sequential black and white images to cause the electrons emitted by said photocathodes to impinge upon the respective targets and produce elemental color images corresponding to said color fields, said images being superposed to form full color images, and a second source of potential constantly imposing a positive bias on said photocathode so that when the target is sequentially de-energized the electrons emitted by said photocathode will be repelled by said target and thereby preventing the formation of the elemental color on the target.

References Cited in the file of this patent

UNITED STATES PATENTS

| | | |
|---|---|---|
| 2,686,219 | Lindenblad | Aug. 10, 1954 |
| 2,704,783 | Sziklai | Mar. 22, 1955 |
| 2,724,737 | Hogan | Nov. 22, 1955 |
| 2,727,941 | Fulmer | Dec. 20, 1955 |
| 2,795,730 | Fromm et al. | June 11, 1957 |
| 2,858,363 | Kazan | Oct. 28, 1958 |

FOREIGN PATENTS

| | | |
|---|---|---|
| 942,375 | France | Feb. 7, 1949 |